United States Patent
Jeong et al.

(10) Patent No.: US 12,132,216 B2
(45) Date of Patent: Oct. 29, 2024

(54) APPARATUS FOR FORMING SEALING PORTION FOR FOLDING SECONDARY BATTERY POUCH

(71) Applicant: CLEVER CO., LTD., Chungcheongbuk-do (KR)

(72) Inventors: Jong Hong Jeong, Chungcheongbuk-do (KR); Sang Jin Kim, Daejeon (KR)

(73) Assignee: CLEVER CO., LTD., Chungcheongbuk-do (KR)

( * ) Notice: Subject to any disclaimer, the term of this patent is extended or adjusted under 35 U.S.C. 154(b) by 521 days.

(21) Appl. No.: 17/426,725

(22) PCT Filed: Oct. 6, 2020

(86) PCT No.: PCT/KR2020/013585
§ 371 (c)(1),
(2) Date: Jul. 29, 2021

(87) PCT Pub. No.: WO2021/071209
PCT Pub. Date: Apr. 15, 2021

(65) Prior Publication Data
US 2022/0102796 A1    Mar. 31, 2022

(30) Foreign Application Priority Data

Oct. 11, 2019   (KR) .......................... 10-2019-0125747

(51) Int. Cl.
*H01M 50/186*   (2021.01)
*B29C 65/00*    (2006.01)
(Continued)

(52) U.S. Cl.
CPC ........... *H01M 50/186* (2021.01); *B29C 65/18* (2013.01); *B29C 66/8145* (2013.01);
(Continued)

(58) Field of Classification Search
CPC ............. H01M 50/105; H01M 50/186; H01M 50/183; H01M 50/178; H01M 2220/20; Y10T 29/4911; Y10T 29/49108
(Continued)

(56) References Cited

U.S. PATENT DOCUMENTS

| 8,501,343 B2* | 8/2013 | You .................... H01M 50/609 |
| | | 429/163 |
| 11,276,893 B2* | 3/2022 | Kim .................... H01M 10/049 |

FOREIGN PATENT DOCUMENTS

| JP | 2000-277893 A | 10/2000 |
| JP | 2013-157286 A | 8/2013 |

(Continued)

OTHER PUBLICATIONS

International Search Report from corresponding PCT Application No. PCT/KR2020/013585, dated Jan. 15, 2021.

*Primary Examiner* — Thiem D Phan
(74) *Attorney, Agent, or Firm* — Harness, Dickey & Pierce, P.L.C.

(57) ABSTRACT

A disclosed apparatus for forming a sealing portion for folding a secondary battery pouch includes: first and second pressing bars disposed to face each other with a sealing portion for folding therebetween to apply pressure for flattening the sealing portion for folding that is defined by the edge of a secondary battery pouch for sealing an electrode assembly accommodated therein; first and second pressing surfaces provided at the first and second pressing bars, respectively, and disposed to face the sealing portion for folding; and a forming protrusion formed on the first pressing surface and configured to form a folding guide line on the sealing portion for folding by pressure applied by the first and second pressing bars.

9 Claims, 7 Drawing Sheets

(51) Int. Cl.
  *B29C 65/18* (2006.01)
  *H01M 10/04* (2006.01)
  *H01M 50/105* (2021.01)
  *H01M 50/184* (2021.01)
  *B29L 31/34* (2006.01)

(52) U.S. Cl.
  CPC ..... *B29C 66/9141* (2013.01); *H01M 10/0404* (2013.01); *H01M 50/105* (2021.01); *H01M 50/184* (2021.01); *B29L 2031/3468* (2013.01); *Y10T 29/49108* (2015.01)

(58) Field of Classification Search
  USPC .......................... 29/623.1, 623.2, 623.4, 854
  See application file for complete search history.

(56) References Cited

FOREIGN PATENT DOCUMENTS

| | | |
|---|---|---|
| KR | 10-2011-0109824 A | 10/2011 |
| KR | 10-2015-0101551 A | 9/2015 |
| KR | 10-2016-0077880 A | 7/2016 |

* cited by examiner

APPARATUS FOR FORMING SEALING PORTION FOR FOLDING SECONDARY BATTERY POUCH

CROSS-REFERENCE TO RELATED APPLICATIONS

This application is a national phase application of PCT Application No. PCT/KR2020/013585, filed on Oct. 6, 2020, which claims the benefit and priority to Korean Patent Application No. 10-2019-0125747, filed on Oct. 11, 2019. The entire disclosures of the applications identified in this paragraph are incorporated herein by references.

TECHNICAL FIELD

The present disclosure relates to an apparatus for forming a sealing portion for folding a secondary battery pouch, in detail, an apparatus for forming a sealing portion for folding a secondary battery pouch, the apparatus being able to improve a folding quality of a sealing portion of a secondary battery pouch and prevent springback of the sealing portion after folding.

BACKGROUND ART

This section provides background information related to the present disclosure which is not necessarily prior art.

Demands for a secondary battery as an energy source is rapidly increasing with technical development and an increase in demand for mobile devices, electric vehicles, and energy storage systems (ESS). Accordingly, many studies of a secondary battery that can satisfy various requirements are being conducted.

Representatively, in terms of shape, there is a high demand for a small-size prismatic secondary battery that can be applied to products such as mobile phones and a large-size pouch-type secondary battery for an electric vehicle, ESS, etc. because they are thin. Further, in terms of material, there is a high demand for a lithium secondary battery such as a lithium ion battery and a lithium ion polymer battery that have the advantages of high energy density, high discharge voltage, stable output, etc.

In order to form a pouch-type lithium secondary battery, an electrode assembly in which a cathode, a separator, and anode are stacked or they are stacked and then wound is put into a temporarily sealed pouch.

Then, upper and lower pouch films are heated and thermally bonded at the open edge of the pouch, whereby a bare cell battery is formed in a sealed pouch type.

The pouches that are used for pouch-type batteries are usually composed of a metal foil layer and a synthetic resin layer covering the metal foil layer. When these pouches are used, the weight of a battery can be remarkably reduced as compared with a metal can is used.

Aluminum is generally used as the metal for forming the foil in a multi-film pouch. A polymer film that is the inner layer of a pouch film protects the metal foil from an electrolyte and prevents a short circuit between the cathode, the anode, and the electrode taps.

However, if the edge of the pouch is not specifically insulated, the metal foil layer forming the intermediate layer of the pouch film is exposed even though it is small. Accordingly, even though both edges are folded and a protective circuit board is attached to the electrode taps to form a core pack battery in a bare cell state, the metal foil is still exposed at the edges of the pouch.

When a core pack battery is directly put into a hard case or the battery box of a product with a metal foil exposed, the metal foil of the pouch film may come in contact with the cathode of the battery through a circuit or other conductors in the hard case or the battery box.

Alternatively, electrical connection may be made through the metal foil of the pouch film, the conductors of the protective circuit board, the conductors of the hard case or the battery box, and the cathode of the battery.

In any case of them, aluminum that is the material of the metal foil of the pouch film and the copper tap of the cathode or a current collector are directly or indirectly connected first, and the aluminum foil of the pouch film may be corroded by electrochemical action. In particular, corrosion of the cathode tap of the pouch may be promoted in a surrounding environment having a leaking electrolyte component or humidity.

When the aluminum foil that functions as a barrier between moisture and oxygen continuously corrodes, it is impossible to sufficiently prevent inflow of moisture and oxygen using only the polymer layer of the pouch film. The blocking ability of a pouch is deteriorated, a problem may be generated in a battery. That is, when the organic electrolyte of an electrolyte separator vaporizes or external moisture or oxygen flows inside, an abnormal phenomenon such as swelling occurs in the pouch, which causes abolishment of the battery, deterioration of performance, and reduced lifespan.

In order to solve these problems, a method of folding both wings of a core pack battery in multiple steps is used.

However, as the demand for a large-capacity secondary battery such as the battery for electric vehicles increases, the demand for increasing the size of the secondary battery pouch increases and widening that increases the length of a secondary battery pouch is in progress. Accordingly, the length of the sealing portion for folding a secondary battery pouch increases, so it is difficult to satisfy the quality required by customers using only existing folding apparatuses.

Further, it is increasingly required to increase the number of times of folding a sealing portion to attenuate the problem with an increase in size of a secondary battery pouch due to an increase in capacity, but it is also difficult to satisfy this requirement of customers using only existing folding apparatuses.

SUMMARY

Technical Problem

An aspect of the present disclosure provides an apparatus for forming a sealing portion for folding a secondary battery pouch, the apparatus being able to improve a folding quality of a sealing portion of a secondary battery pouch and prevent spring back of the sealing portion after folding.

This section provides a general summary of the disclosure and is not a comprehensive disclosure of its full scope or all of its features.

According to an aspect of the present disclosure, there is provided an apparatus for forming a sealing portion for folding a secondary battery pouch, the apparatus including: first and second pressing bars disposed to face each other with a sealing portion for folding therebetween to apply pressure for flattening the sealing portion for folding that is defined by the edge of a secondary battery pouch for sealing an electrode assembly accommodated therein; first and second pressing surfaces provided at the first and second pressing bars, respectively, and disposed to face the sealing portion for folding; and a forming protrusion formed on the first pressing surface and configured to form a folding guide line on the sealing portion for folding by pressure applied by the first and second pressing bars.

Technical Solution

In the apparatus for forming a sealing portion for folding a secondary battery pouch according to an aspect of the present disclosure, it is preferable that the first and second pressing bars have a length larger than the length of the sealing portion for folding which corresponds to a side of an electrode assembly, and is disposed in parallel with the side of the electrode assembly; and the forming protrusion is continuously provided from an end to another end in the longitudinal direction of the first and second pressing bars and forms the folding guide line.

In the apparatus for forming a sealing portion for folding a secondary battery pouch according to an aspect of the present disclosure, it is preferable to have a forming groove portion provided on the second pressing surface and disposed to face and correspond to the forming protrusion.

In the apparatus for forming a sealing portion for folding a secondary battery pouch according to an aspect of the present disclosure, it is preferable that a surface of the sealing portion for folding is compressed by the forming protrusion and another surface of the sealing portion for folding is tensioned and extended by the forming groove portion, whereby the folding guide line is formed.

In the apparatus for forming a sealing portion for folding a secondary battery pouch according to an aspect of the present disclosure, the apparatus includes heating units inserted in the first and second pressing bars and heating the first and second pressing bars, and it is preferable that the heating units include: a common heater longitudinally applies heat to the entire first and second pressing bars; separate heaters independently applying heat to a plurality of sections separated in the longitudinal direction of the first and second pressing bars; and a controller controlling the longitudinal temperature distribution of the first and second pressing bars by controlling the operation of the separate heaters on the basis of the temperatures of the sections.

In the apparatus for forming a sealing portion for folding a secondary battery pouch according to an aspect of the present disclosure, the forming groove portion may be formed through deformation by pressure that is applied by the forming protrusion.

In the apparatus for forming a sealing portion for folding a secondary battery pouch according to an aspect of the present disclosure, the forming groove portion may be an elastic rod disposed to correspond to the forming protrusion and inserted in the second pressing surface.

DETAILED DESCRIPTION

Hereafter, embodiments of an apparatus for forming a sealing portion for folding a secondary battery pouch according to the present disclosure are described in detail with reference to the drawings.

However, it should be noted that the intrinsic spirit of the present disclosure should not be construed as being limited to embodiments to be described hereafter and includes a range easily proposed by replacing or changing embodiments to be described below by those skilled in the art on the basis of the intrinsic spirit of the present disclosure.

Further, the terms to be used hereafter are selected for the convenience of description and should be appropriately construed as meanings coinciding with the intrinsic spirit of the present disclosure, not being limited to the meanings in dictionaries when finding out the spirit of the present disclosure.

Figure 1:
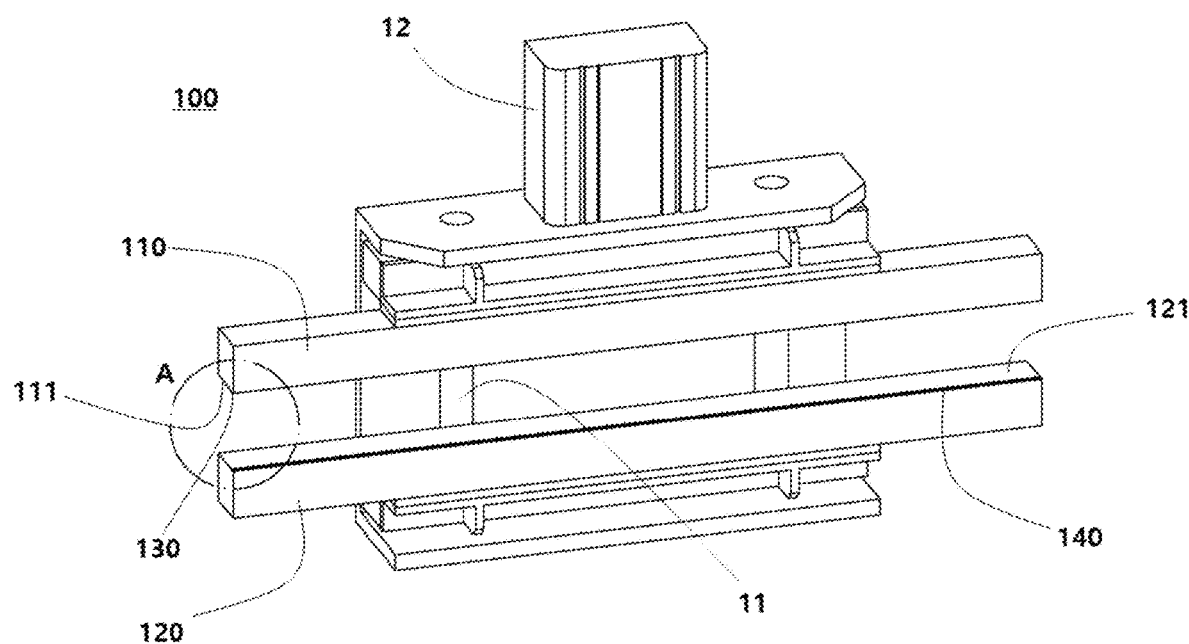
FIG. 1 is a view showing an embodiment of an apparatus for forming a sealing portion for folding a secondary battery pouch according to the present disclosure.
Figure 2:
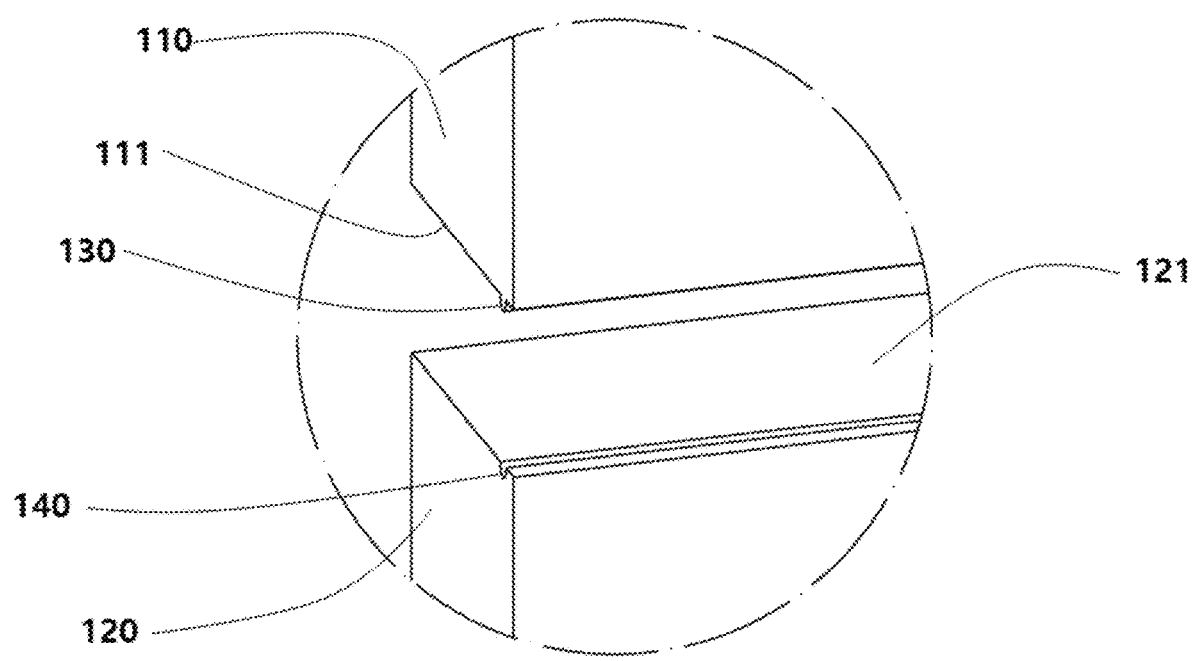
FIG. 2 is an enlarged view showing the part A shown in FIG. 1.
Figure 3:
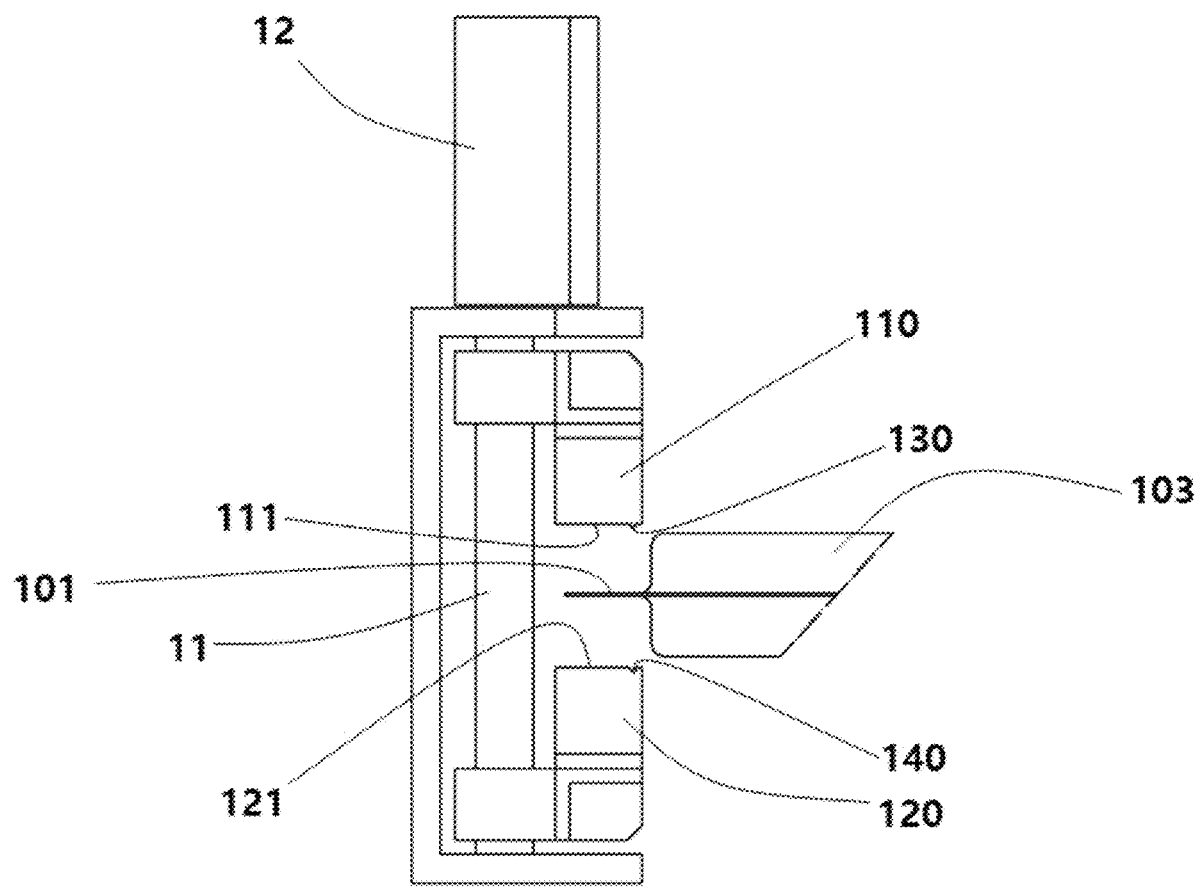
FIGS. 3 and 4 are views showing a process of forming a sealing portion for folding a secondary battery pouch using the apparatus shown in FIG. 1.
Figure 4:
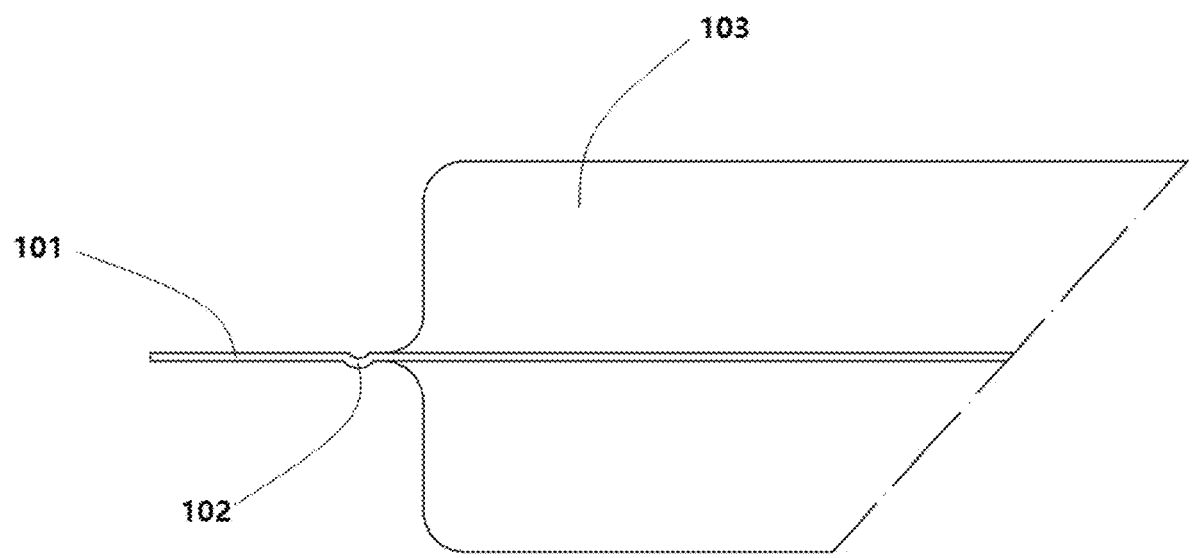
Figure 5:
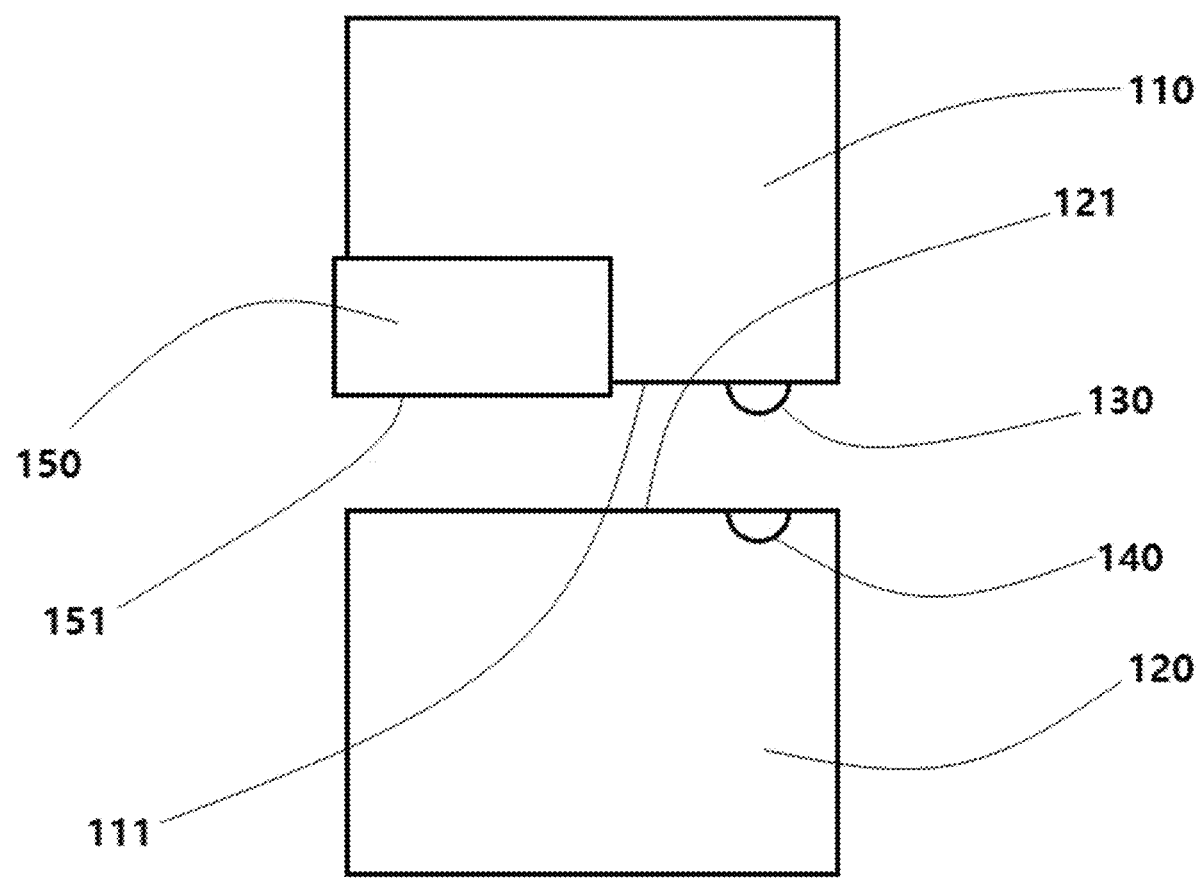
FIG. 5 is a view showing a modified example of FIG. 1.
Figure 6:
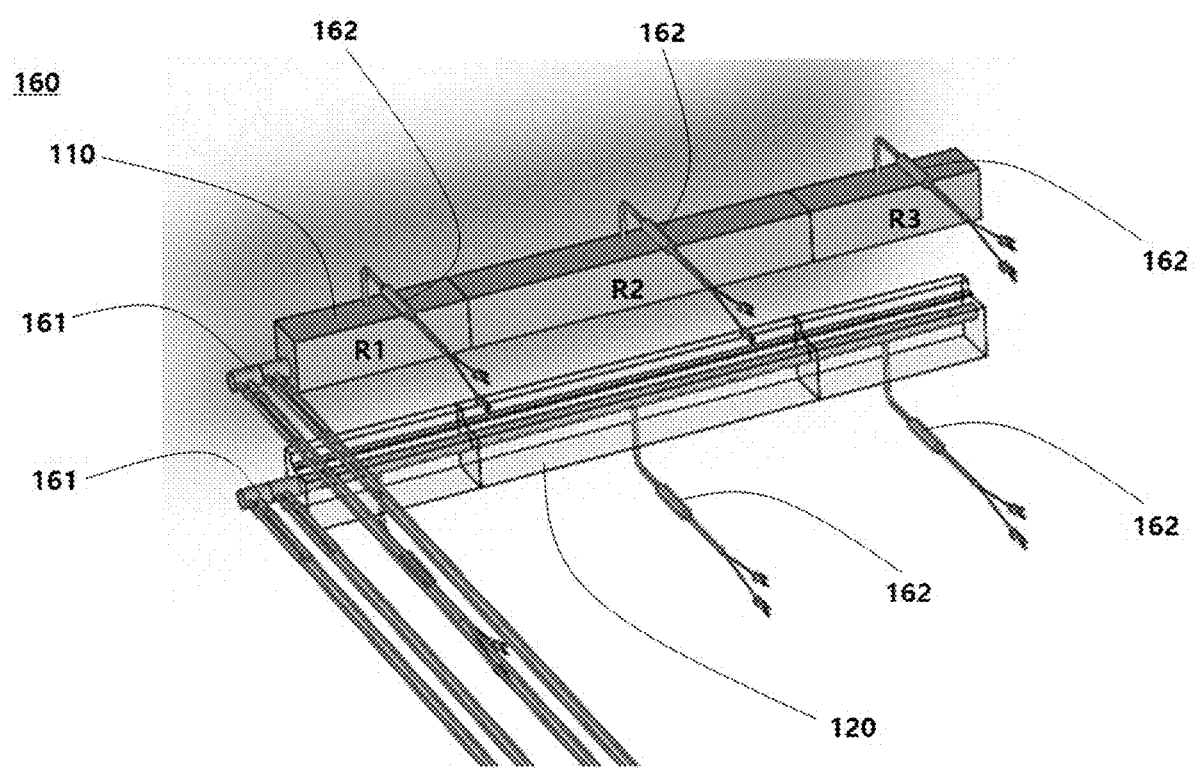
FIG. 6 is a view showing a heating unit shown in FIG. 1.

FIG. 1 is a view showing an embodiment of an apparatus for forming a sealing portion for folding a secondary battery pouch according to the present disclosure, FIG. 2 is an enlarged view showing the part A shown in FIG. 1, FIGS. 3 and 4 are views showing a process of forming a sealing portion for folding a secondary battery pouch using the apparatus shown in FIG. 1, FIG. 5 is a view showing a modified example of FIG. 1, and FIG. 6 is a view showing a heating unit shown in FIG. 1.

First, referring to FIGS. 1 to 5, an apparatus 100 for forming a sealing portion for folding a secondary battery pouch according to the present embodiment includes first and second pressing bars 110 and 120, first and second pressing surfaces 111 and 121, and a forming protrusion 130.

Accordingly, a sealing portion 101 for folding a secondary battery pouch is flattened and a folding guide line 102 is formed, whereby it is possible to improve the process quality of a following folding process. In particular, it is possible to dramatically solve the problem that as secondary battery pouches are widened (the length is increased), the length of a folding region to be folded is increased, so a poor folding is caused.

The first and second pressing bars 110 and 120 are disposed to face each other with a sealing portion for folding therebetween to apply pressure for flattening the sealing portion 101 for folding that is defined by the edge of a secondary battery pouch for sealing an electrode assembly 103 accommodated therein.

The first and second pressing bars 110 and 120 are provided in long bar shapes and are disposed up and down in parallel, and any one or both of the pressing bars presses and flattens the sealing portion 101 for folding a secondary battery pouch disposed therebetween by moving up and down.

Obviously, an elevation guide 11 and a driving motor 12 may be provided to move up and down the first and second pressing bars 110 and 120, but these components are not necessary in the present embodiment because various structures can be selected by a designer.

The first and second pressing surfaces 111 and 121 are provided at the first and second pressing bars 110 and 120, respectively, and are disposed to face the sealing portion 101 for folding.

The first and second pressing surfaces 111 and 121, which are surfaces that meet each other by the first and second pressing bars 110 and 120 moving up and down, apply pressure for flattening the sealing portion 101 for folding.

The forming protrusion 130 is formed on the first pressing surface 111 and is configured to form the folding guide line 102 on the sealing portion 101 for folding by pressure applied by the first and second pressing bars 110 and 120.

The first and second pressing bars 110 and 120 have a length larger than the length of the sealing portion 101 for folding which corresponds to a side of an electrode assembly 103, and is disposed in parallel with the side of the electrode assembly.

That is, the first and second pressing bars 110 and 120 have a length such that they may flatten the entire sealing portion 101 for folding.

The forming protrusion 130 is continuously provided from an end to another end in the longitudinal direction of the first and second pressing bars 110 and 120 and forms the folding guide line 102.

In the present embodiment, it is preferable that a forming groove portion 140 corresponding to the forming protrusion 130 is provided.

The forming groove portion 140 is provided on the second pressing surface 121 and is disposed to face and correspond to the forming protrusion 130.

The forming groove portion 140 is formed such that the forming protrusion 130 is inserted therein when the first and second pressing bars 110 and 120 are moved up and down, and is continuously provided from an end to another end in the longitudinal direction of the second pressing bar 120.

A surface of the sealing portion 101 for folding is compressed by the forming protrusion 130 and another surface of the sealing portion 101 for folding is tensioned and extended by the forming groove portion 140, whereby the folding guide line 102 is formed.

Accordingly, unfolding due to springback is prevented when folding is performed inward about the forming groove portion formed on the sealing portion 101 for folding by the forming protrusion 130.

In the present embodiment, it is required to control the degree of close contact between the first and second pressing surfaces 111 and 121 (that is, the force pressing the sealing portion 101 for folding), depending on the thickness of the sealing portion 101 for folding. This is because the sealing portion 101 for folding may be torn or damaged when the first and second pressing surfaces 111 and 121 are brought in close contact with each other regardless of the thickness of the sealing portion 101 for folding.

To this end, it is preferable to add a gap adjuster 150 that is provided at any one of the first and second pressing bars 110 and 120 and controls the gap between the first and second pressing surfaces 111 and 121.

Referring to FIG. 5, the gap adjuster 150 is inserted in the first pressing bar 110 and has a gap adjustment surface 151 protruding by a predetermined thickness toward the second pressing surface 121 from the first pressing surface 111.

Accordingly, it is possible to control the pressure that is applied to the sealing portion 101 for folding by adjusting the gap between the first and second pressing surfaces 111 and 121.

In FIG. 5, it is preferable that the gap adjuster 150 is provided longitudinally throughout the first pressing bar 110 to apply uniform pressure to the entire surface of the sealing portion 101 for folding. This is specifically applied to a long secondary battery pouch, so-called 'long-width cell'.

Unlikely, it is apparent that a plurality of gap adjusters 150 may be separately arranged with gaps therebetween in the longitudinal direction of the first pressing bar 110.

The apparatus 100 for forming a sealing portion for folding a secondary battery pouch according to the present embodiment includes heating units 160 for heating the sealing portion 101 for folding.

The heating units 160 are inserted in the first and second pressing bars 110 and 120 and heat the first and second pressing bars 110 and 120.

The heating unit 160 includes a common heater 161 and separate heaters 162, so the amount of heat that is applied to the sealing portion 101 for folding by the first and second pressing bars 110 and 120 may be uniformly controlled throughout the entire surface.

The common heater 161 longitudinally applies heat to the entire first and second pressing bars 110 and 120.

When the first and second pressing bars 110 and 120 are heated by only the common heaters 161, it is impossible to uniformly heat the entire first and second pressing bars 110 and 120 due to electrical resistance according to a length and differences of a loss of heat according to positions through the outer surfaces of the first and second pressing bars 110 and 120.

The separate heaters 162 are provided to solve this problem.

The separate heaters 162 independently apply heat to a plurality of sections R1, R2, and R3 separated in the longitudinal direction of the first and second pressing bars 110 and 120.

A controller for separately applying electric power to the separate heaters 162 is provided.

The controller controls the longitudinal temperature distribution of the first and second pressing bars 110 and 120 by controlling the operation of the separate heaters 162 on the basis of the temperatures of the sections R1, R2, and R3.

Figure 7:
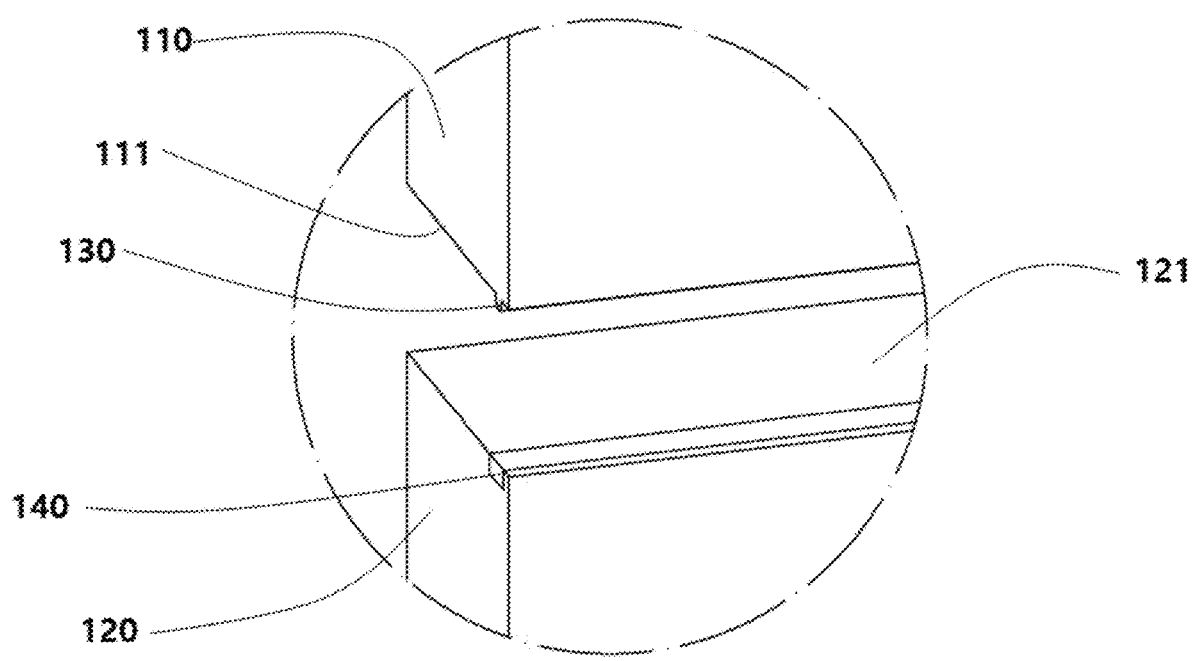
FIG. 7 is a view showing a modified example of FIG. 2.

FIG. 7 is a view showing a modified example of FIG. 2.

Referring to FIG. 7, an apparatus 100 for forming a sealing portion for folding a secondary battery pouch according to the present embodiment has a difference in the forming groove portion 140 from the previous embodiment. The other configuration is the same as the previous embodiment except for the forming groove portion 140, so a description thereof will be omitted.

In the present embodiment, the forming groove portion 140 is formed through deformation by pressure that is applied by the forming protrusion 130.

In detail, the forming groove portion 140 is not formed in a groove shape on the second pressing surface 121 but is formed through deformation by pressure only when the pressure is applied by the forming protrusion 130 with the first and second pressing surfaces 111 and 121 facing each other.

To this end, the forming groove portion 140 may be an elastic (e.g., silicon) rod disposed to correspond to the forming protrusion 130 and inserted in the second pressing surface 121.

Unlikely, it is apparent that the groove-shaped forming groove portion 140 may be formed on an elastic rod, as in the previous embodiment. In this case, the groove of the forming groove portion 140 may be formed in a small size in consideration of elastic deformation. This configuration attenuates excessive force that is applied to the sealing portion 101 for folding when the folding guide line 102 is formed, thereby preventing tearing or damage.

According to the present disclosure, since a folding guide line is formed on a sealing portion of a secondary battery pouch by a forming protrusion and a forming groove portion, it is possible to improve the folding quality and prevent springback after folding.

According to the present disclosure, it is possible to solve the problem that as secondary battery pouches are widened (the length is increased), the length of a folding region to be folded is increased, so a poor folding is caused.

While the present disclosure has been shown and described in connection with the exemplary embodiments, it will be apparent to those skilled in the art that modifications and variations can be made without departing from the spirit and scope of the disclosure as defined by the appended claims.

What is claimed is:

1. An apparatus for forming a sealing portion for folding a secondary battery pouch, the apparatus comprising:
    first and second pressing bars disposed to face each other with a sealing portion for folding therebetween to apply pressure for flattening the sealing portion for folding that is defined by an edge of the secondary battery pouch for sealing an electrode assembly accommodated therein;
    first and second pressing surfaces provided at the first and second pressing bars, respectively, and disposed to face the sealing portion for folding;
    a forming protrusion formed on the first pressing surface and configured to form a folding guide line on the sealing portion for folding by pressure applied by the first and second pressing bars; and
    a forming groove portion provided on the second pressing surface and disposed to face and correspond to the forming protrusion,
    wherein a surface of the sealing portion for folding is compressed by the forming protrusion and another surface of the sealing portion for folding is tensioned and extended by the forming groove portion, whereby the folding guide line is formed.

2. The apparatus of claim 1, wherein the first and second pressing bars have a length larger than a length of the sealing portion for folding which corresponds to a side of the electrode assembly, and is disposed in parallel with the side of the electrode assembly; and
    the forming protrusion is continuously provided from an end to another end in a longitudinal direction of the first and second pressing bars and forms the folding guide line.

3. The apparatus of claim 1, further comprising heating units inserted in the first and second pressing bars and heating the first and second pressing bars,
    wherein the heating units include:
    a common heater longitudinally applies heat to the entire first and second pressing bars;
    separate heaters independently respectively applying heat to a plurality of sections separated in a longitudinal direction of the first and second pressing bars; and
    a controller controlling a longitudinal temperature distribution of the first and second pressing bars by controlling an operation of the separate heaters on the basis of temperatures of the sections.

4. The apparatus of claim 1, wherein the forming groove portion is formed through deformation by pressure that is applied by the forming protrusion.

5. The apparatus of claim 4, wherein the forming groove portion is an elastic rod disposed to correspond to the forming protrusion and inserted in the second pressing surface.

6. The apparatus of claim 1, further comprising a gap adjuster provided at any one of the first and second pressing bars and controlling a gap between the first and second pressing surfaces.

7. The apparatus of claim 6, wherein the gap adjuster is provided at any one of the first and second pressing surfaces and has a gap adjustment surface protruding by a predetermined thickness toward the other one of the first and second pressing surfaces.

8. The apparatus of claim 7, wherein the gap adjuster is provided at any one of the first and second pressing surfaces and is provided longitudinally throughout the first and second pressing bars.

9. The apparatus of claim 1, further comprising heating units inserted in the first and second pressing bars and heating the first and second pressing bars to heat the sealing portion for folding,
    wherein the heating units include:
    a common heater longitudinally applies heat to the entire first and second pressing bars;
    separate heaters independently respectively applying heat to a plurality of sections separated in a longitudinal direction of the first and second pressing bars; and
    a controller controlling a longitudinal temperature distribution of the first and second pressing bars by controlling an operation of the separate heaters on the basis of temperatures of the sections.

* * * * *